(12) United States Patent
Yoon

(10) Patent No.: US 7,518,694 B2
(45) Date of Patent: Apr. 14, 2009

(54) LIQUID CRYSTAL DISPLAY PANEL AND FABRICATING METHOD THEREOF

(75) Inventor: Sung Hoe Yoon, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 335 days.

(21) Appl. No.: 11/296,371

(22) Filed: Dec. 8, 2005

(65) Prior Publication Data
US 2006/0244894 A1 Nov. 2, 2006

(30) Foreign Application Priority Data
Apr. 29, 2005 (KR) ............... 10-2005-0036404

(51) Int. Cl.
G02F 1/1339 (2006.01)
(52) U.S. Cl. .............. 349/155; 349/156; 349/157
(58) Field of Classification Search .......... 349/155–157
See application file for complete search history.

(56) References Cited

U.S. PATENT DOCUMENTS 5,680,187 A * 10/1997 Nagayama et al. .......... 349/110
5,757,451 A 5/1998 Miyazaki et al.
2003/0214623 A1* 11/2003 Ebisu et al. ................. 349/156
2005/0185130 A1* 8/2005 Oh et al. .................... 349/156
2005/0190336 A1* 9/2005 Chen ......................... 349/155

FOREIGN PATENT DOCUMENTS

| DE | 10 2004 052 042 A1 | 9/2005 |
|---|---|---|
| GB | 2411485 A | 8/2005 |
| JP | 10-039318 A | 2/1989 |
| JP | 03-015824 A | 1/1991 |

* cited by examiner

Primary Examiner—David Nelms
Assistant Examiner—Thanh-Nhan P Nguyen
(74) Attorney, Agent, or Firm—Holland & Knight LLP

(57) ABSTRACT

A liquid crystal display panel includes an upper array substrate and a lower array substrate that are positioned to be opposite to each other, a liquid crystal positioned between the upper and lower array substrates, a protrusion projecting from the lower array substrate and a spacer positioned between the upper array substrate and the lower array substrate, the spacer having a first portion contacting the protrusion and a second portion contacting the upper array substrate, and the first portion has a first hardness different from a second hardness of a second portion.

15 Claims, 13 Drawing Sheets

FIG. 7
MFM OF EXAMPLE) Multifunctional Acrylate monomer
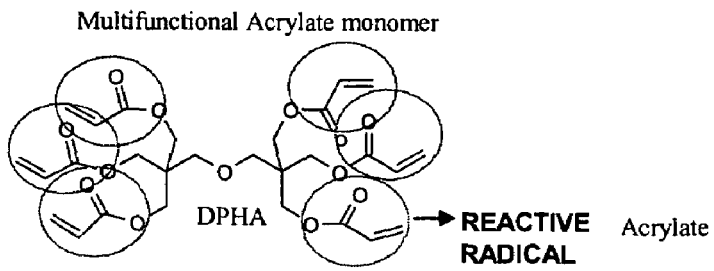
DPHA → REACTIVE RADICAL   Acrylate
MFO OF EXAMPLE) Bi-functional Acrylate oligomer
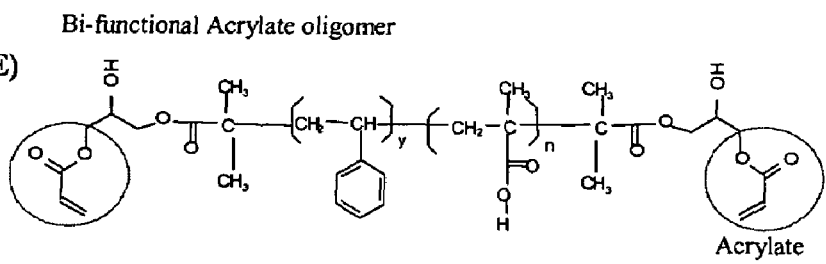
Acrylate
MFP OF EXAMPLE) Acrylate co-polymer or reactive polymer
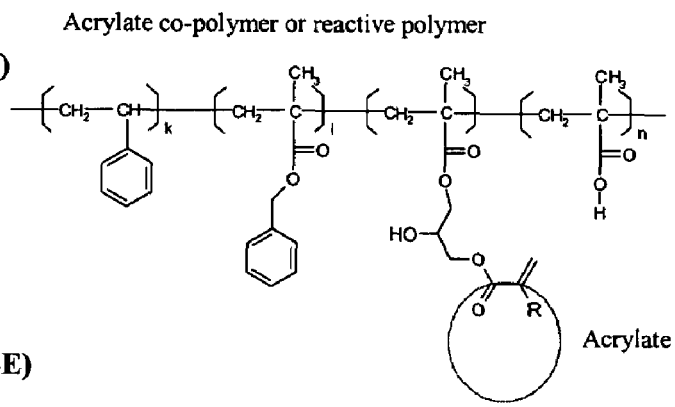
Acrylate
PI OF EXAMPLE)
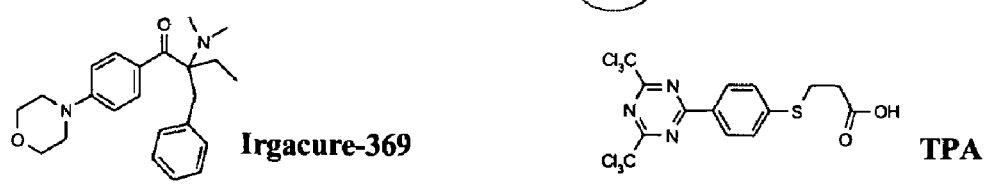
Irgacure-369          TPA
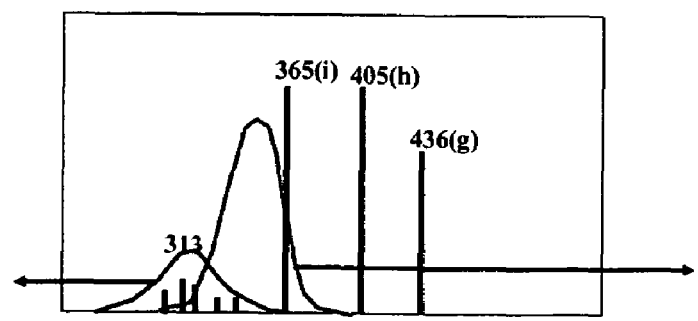
Irgacure-369 MAIN LIGHT ABSORPTION WAVELENGTH                TPA MAIN LIGHT ABSORPTION WAVELENGTH

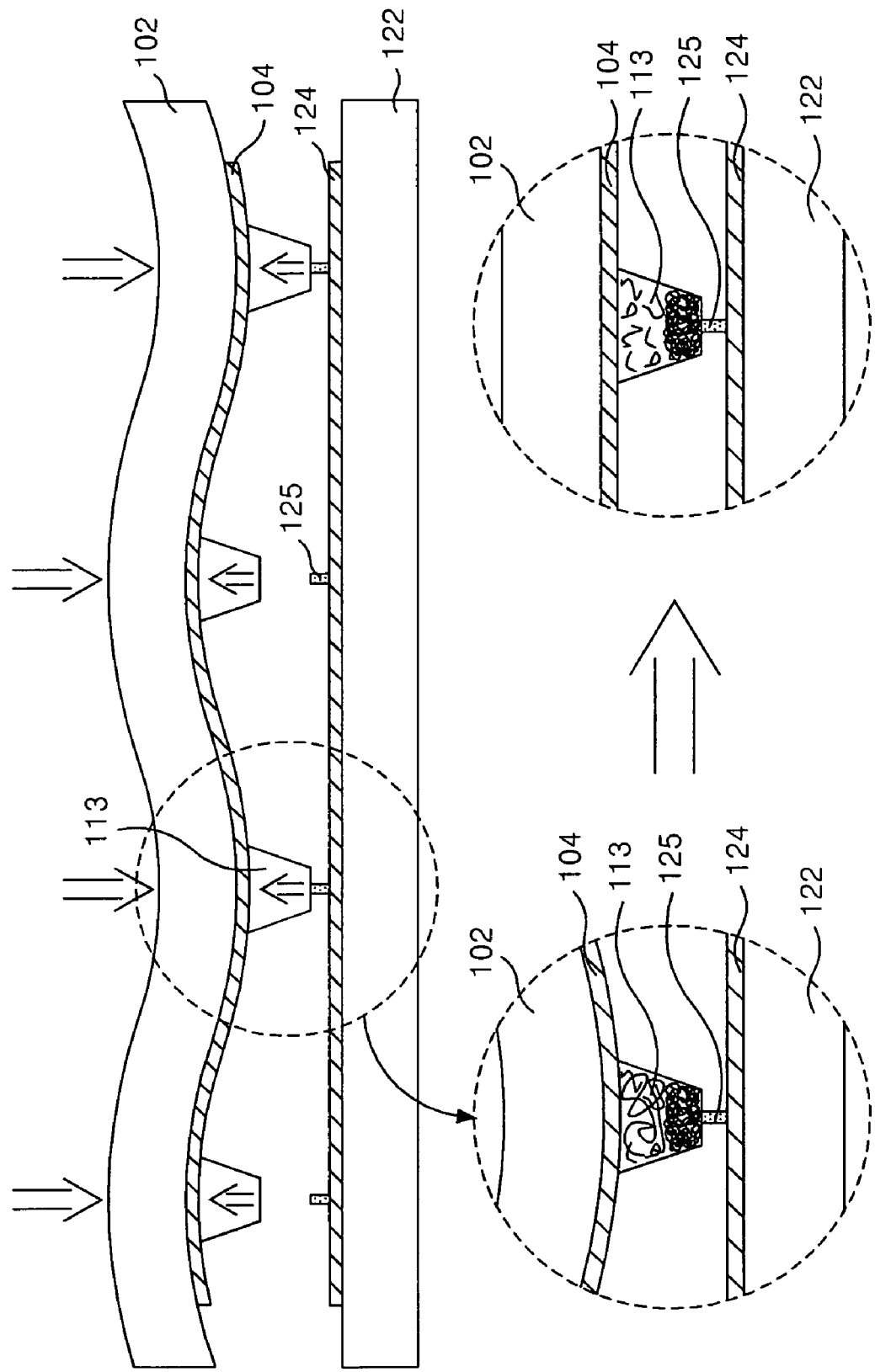

LIQUID CRYSTAL DISPLAY PANEL AND FABRICATING METHOD THEREOF

This application claims the benefit of the Korean Patent Application No. P2005-36404 filed on Apr. 29, 2005, which is hereby incorporated by reference in its entirety.

BACKGROUND OF THE INVENTION

1. Field of the Invention

The present invention relates to a display device, and more particularly to a liquid crystal display panel and a fabricating method thereof. Although the present invention is suitable for a wide scope of applications, it is particularly suitable for preventing waviness in the liquid crystal display panel and maintaining a cell gap of the liquid crystal display panel.

2. Description of the Related Art

Generally, a liquid crystal display device LCD controls the light transmittance of liquid crystal cells in accordance with a video signal, thereby displaying a picture on liquid crystal display panel that corresponds to the video signal. More particularly, the liquid crystal display device includes a liquid crystal display panel in which liquid crystal cells are arranged in a matrix. Drive circuits for driving the liquid crystal cells are also positioned on the liquid crystal display panel.

FIG. 1 is a cross-sectional diagram of a related art liquid crystal display panel. The liquid crystal display panel shown in FIG. 1 includes an upper array substrate 2, which is also known as a color filter array substrate 2, and a lower array substrate 22, which is also known as a thin film transistor array substrate. A liquid crystal area 5 is in a cell gap between the upper array substrate 2 and the lower array substrate 22. The cell gap of the liquid crystal area 5 is maintained by spacers 13 positioned between the upper array substrate 2 and the lower array substrate 22.

A first thin film pattern 4, such as a black matrix and a color filter is formed on the upper array substrate 2. A second thin film pattern 24, such as a thin film transistor, a signal line and a pixel electrode, is formed on the lower array substrate 22. The spacers 13 are formed on the upper array substrate 2 to define the liquid crystal area 5 by keeping a cell gap between the upper array substrate 2 and the lower array substrate 22.

In such a related art liquid crystal display panel, the upper and lower array substrates 2 and 22 are provided and then a liquid crystal dropping process for spreading the liquid crystal over at least one of the upper array substrate 2 and the lower array substrate 22 is performed. Subsequently, the upper array substrate 2 and the lower array substrate 22 are bonded together with both spacers 13 and the liquid crystal area 5 between the upper array substrate 2 and the lower array substrate 22.

Right after the related art VALC process is performed, the liquid crystal is concentrated at a center part of the liquid crystal display panel. Thus, the cell gap of the center part of the liquid crystal display panel is thicker than the rest of the liquid crystal display panel right after the bonding process. After awhile, the liquid crystal gradually spreads out such that cell gap of the center part of the liquid crystal display panel decreases while the cell gap of the rest of the liquid crystal display panel increases. The cell gap will eventually become uniform across the entire liquid crystal display panel in accordance with the height of the spacers 13.

Friction occurs between the spacer 13 and an area of the lower array substrate 22 that is in contact with the spacer 13. This friction can generate a problem in that internal structures of the liquid crystal display panel can be damaged, such as the signal lines. FIG. 2 is a cross-sectional diagram of a related art liquid crystal display panel having a spacer in contact with a protrusion 25 on the lower array substrate. To prevent such internal structure damage, the protrusion 25 is formed on the lower array substrate 22 and contacts the spacer 13, as shown in FIG. 2. Accordingly, the problem of a frictional force between the spacer 13 and the lower array substrate 22 causing damage is solved.

As shown in the dotted circle magnified portion of FIG. 2, the pressure is concentrated at a center part of the spacer 13 that is in contact with the protrusion 25. This pressure prevents the spacer 13 from moving along the lower array substrate 22. However, this pressure can cause the problem of not being able to alleviate waviness in the upper array substrate 2 because of the large static friction between the spacer and the protrusion. The waviness degrades the uniformity of the cell gap across the liquid crystal display panel.

FIG. 3 is a diagram of the waviness in an upper array substrate. The upper array substrate 2 can have a waviness with a cycle of 5~20 mm and size of 0.02~0.03 μm before the bonding process. Right after the upper array substrate 2 is bonded to the lower array substrate 22, a force FEXT applied from the outside to the inside of the liquid crystal display panel is greater than a force FINNER applied from the inside of the liquid crystal display panel to the outside of the liquid crystal display panel. The mathematical relationship of the forces are as follows.

$$FEXT > FINNER, (FINNER = FLC + FCS) \quad \text{[MATHEMATICAL FORMULA 1]}$$

where

FEXT=a force applied from the outside to the inside of the panel,

FINNER=a force applied from the inside to the outside of the panel, which is opposite to the force from the outside, FLC=a force with which the liquid crystal pushes the substrate, and FCS=a force with which the protrusion pushes the spacer.

The waviness spreads across the entire liquid crystal display panel after some time elapses such that the force FEXT applied from the outside to the inside of the liquid crystal display panel becomes equal to the force FINNER applied from the inside to the outside of the liquid crystal display panel.

An upper array substrate 2 with such waviness can be leveled when the force FEXT applied from the outside to the inside of the liquid crystal display panel is equal to the force FINNER applied from the inside to the outside of the liquid crystal display panel, as shown in MATHEMATICAL FORMULA 2 below.

$$FEXT = FINNER, (FINNER = FLC + FCS),\ (FCS = PCS * ACS) \quad \text{[MATHEMATICAL FORMULA 2]}$$

where

PCS=a pressure applied to a contacting area between the spacer and the protrusion, and ACS=an area of the contact area between the spacer and the protrusion.

However, the spacers 13 contacting the protrusions 25 can only be partially depressed and are held in place on the protrusions, which results in a contact density between the spacers 13 and the protrusions 25 of about 50 ppm and a recovery rate of the spacer 13 is about 60% or lower. FIG. 4 is an experimental data showing the non-uniformity of a cell gap in the related art liquid crystal display panel. Because the protrusions 25 can only be partially depressed causing a static friction between some of the spacers and the protrusions, pressure is transmitted up to the entire upper array substrate 2 through some of the spacers 13 such that waviness of the upper array substrate 2 can not leveled and the cell gap is uneven as illustrated in an experimental result shown in FIG. 4. The non-uniformity of the cell gap causes imperfections in the images on the liquid crystal display panel.

SUMMARY OF THE INVENTION

Accordingly, the present invention is directed to a liquid crystal display panel and a fabricating method thereof that substantially obviate one or more of the problems due to limitations and disadvantages of the related art.

An object of the present invention is to provide a liquid crystal display panel and a fabricating method thereof that are adapted to prevent waviness of an upper array substrate of the liquid crystal display panel.

Another object of the present invention is to improve uniformity of a cell gap of the liquid crystal display panel.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other objects of the invention, a liquid crystal display panel according to an aspect of the present invention includes an upper array substrate and a lower array substrate that are positioned to be opposite to each other, a liquid crystal positioned between the upper and lower array substrates, a protrusion projecting from the lower array substrate and a spacer positioned between the upper array substrate and the lower array substrate, a spacer positioned between the upper array substrate and the lower array substrate, the spacer having a first portion contacting the protrusion and a second portion contacting the upper array substrate, and the first portion has a first hardness different from a second hardness of a second portion.

In another aspect, a fabricating method of a liquid crystal display panel includes providing an upper array substrate having first thin film patterns, providing a lower array substrate having second thin film patterns, forming a protrusion on the lower array substrate, forming a spacer on the upper array substrate, the spacer having a first portion with a first hardness and a second portion with a second hardness different from the first hardness, providing a liquid crystal between the upper and lower array substrates, and bonding the upper and lower array substrates such that the first portion of the spacer contacts the protrusion and the second portion of the spacer contacts the upper array substrate.

In yet another aspect, a liquid crystal display panel includes an upper array substrate and a lower array substrate that are positioned to be opposite to each other, a liquid crystal positioned between the upper and lower array substrates, a protrusion projecting from the lower array substrate, and a spacer positioned between the upper array substrate and the lower array substrate, the spacer having a first portion contacting the protrusion and a second portion contacting the upper array substrate, and the first portion of the spacer has a first molecular chain structure a higher compactness than a second molecular chain structure in the second portion of the spacer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIG. 7 is a diagram representing a structure of molecules that constitute a spacer in an embodiment of the present invention.

FIG. 11 is a diagram for explaining function of the spacer in an embodiment of the present invention in conjunction with the liquid crystal display panel.

DETAILED DESCRIPTION OF THE PREFERRED EMBODIMENTS

Reference will now be made in detail to the preferred embodiments of the present invention, examples of which are illustrated in the accompanying drawings. Hereinafter, with reference to FIGS. 5 to 11, the preferred embodiments of the present invention will be explained.

Figure 1:
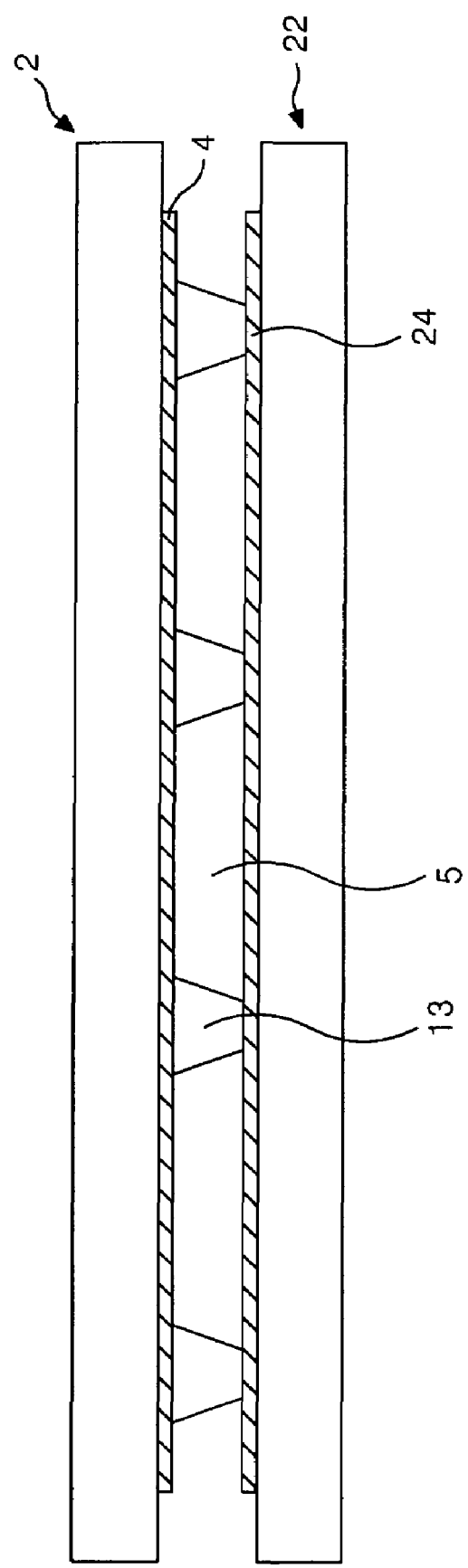
FIG. 1 is a cross-sectional diagram of a related art liquid crystal display panel.
Figure 2:
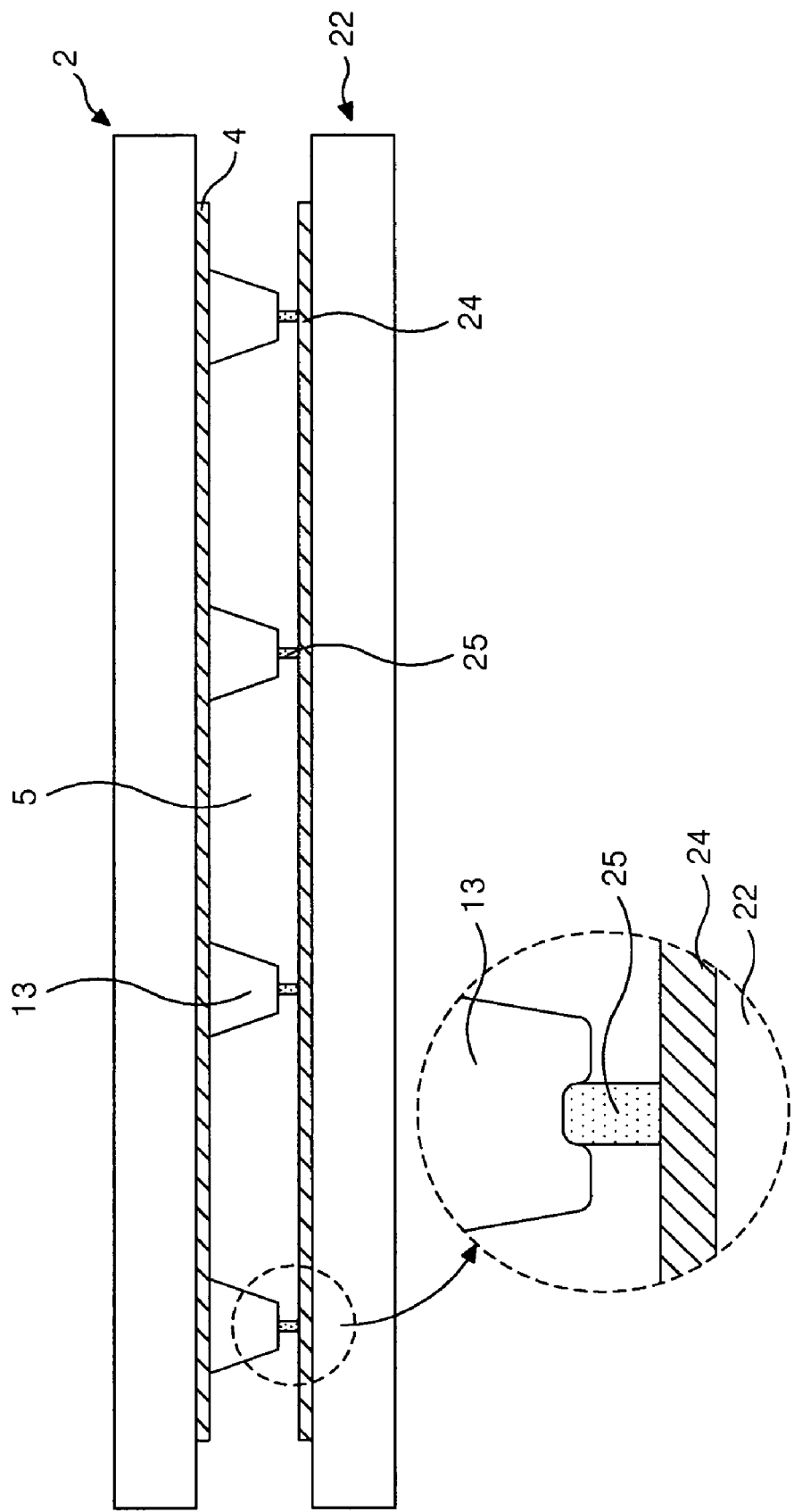
FIG. 2 is a cross-sectional diagram of a related art liquid crystal display panel having a spacer in contact with a protrusion on the lower array substrate.
Figure 3:
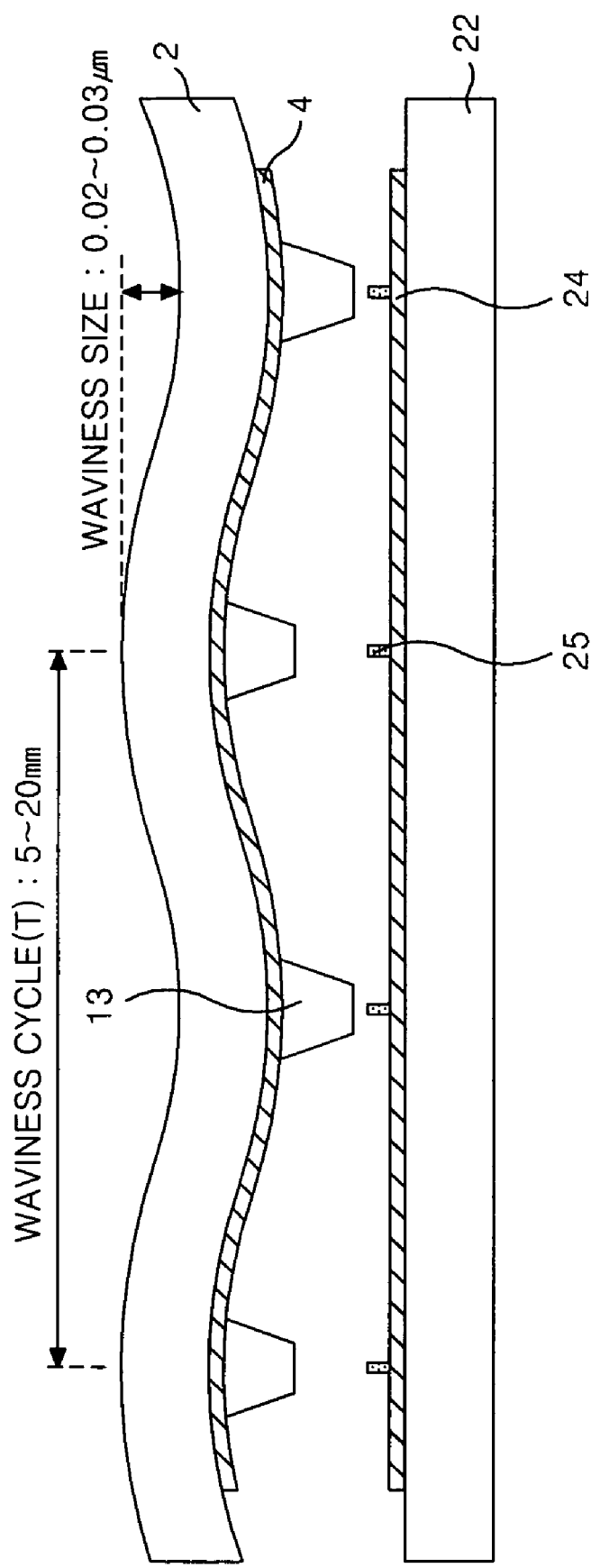
FIG. 3 is a diagram of the waviness in a related art upper array substrate of a liquid crystal display panel.
Figure 4:
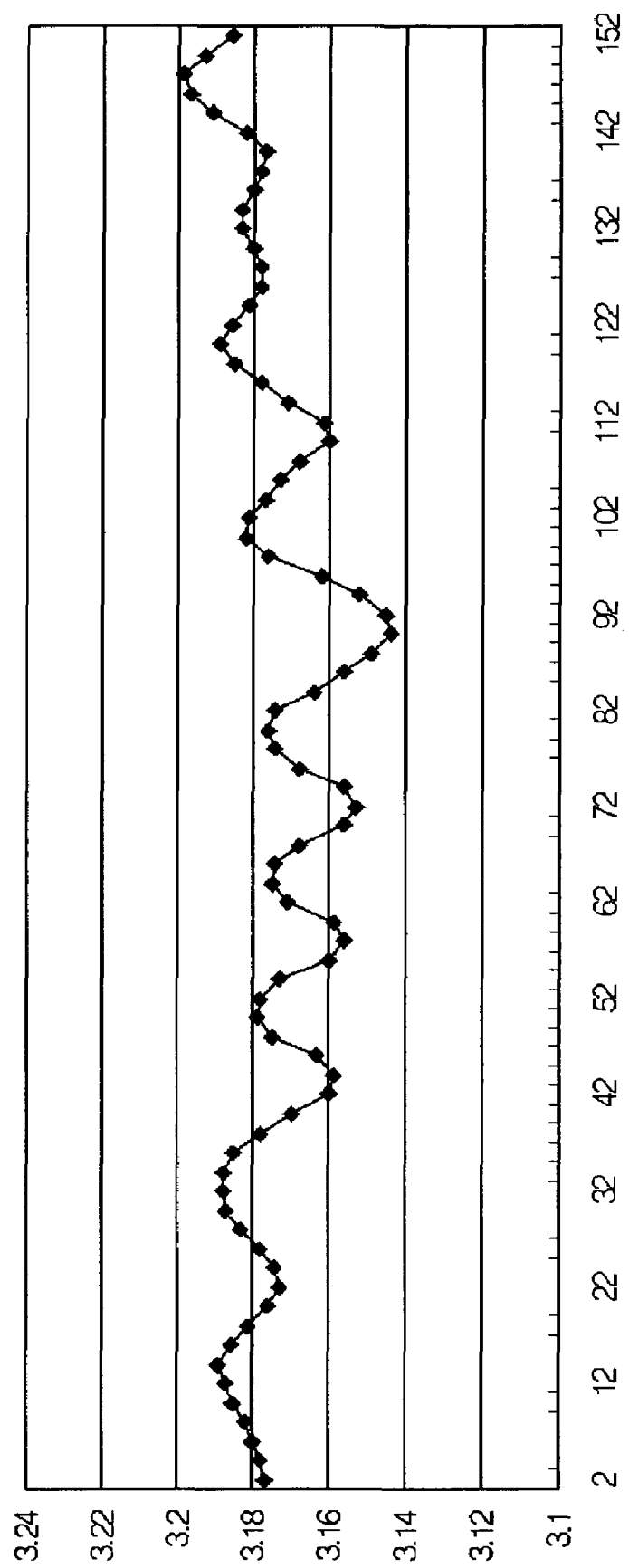
FIG. 4 is an experimental data showing the non-uniformity of a cell gap in the related art liquid crystal display panel.
Figure 5:
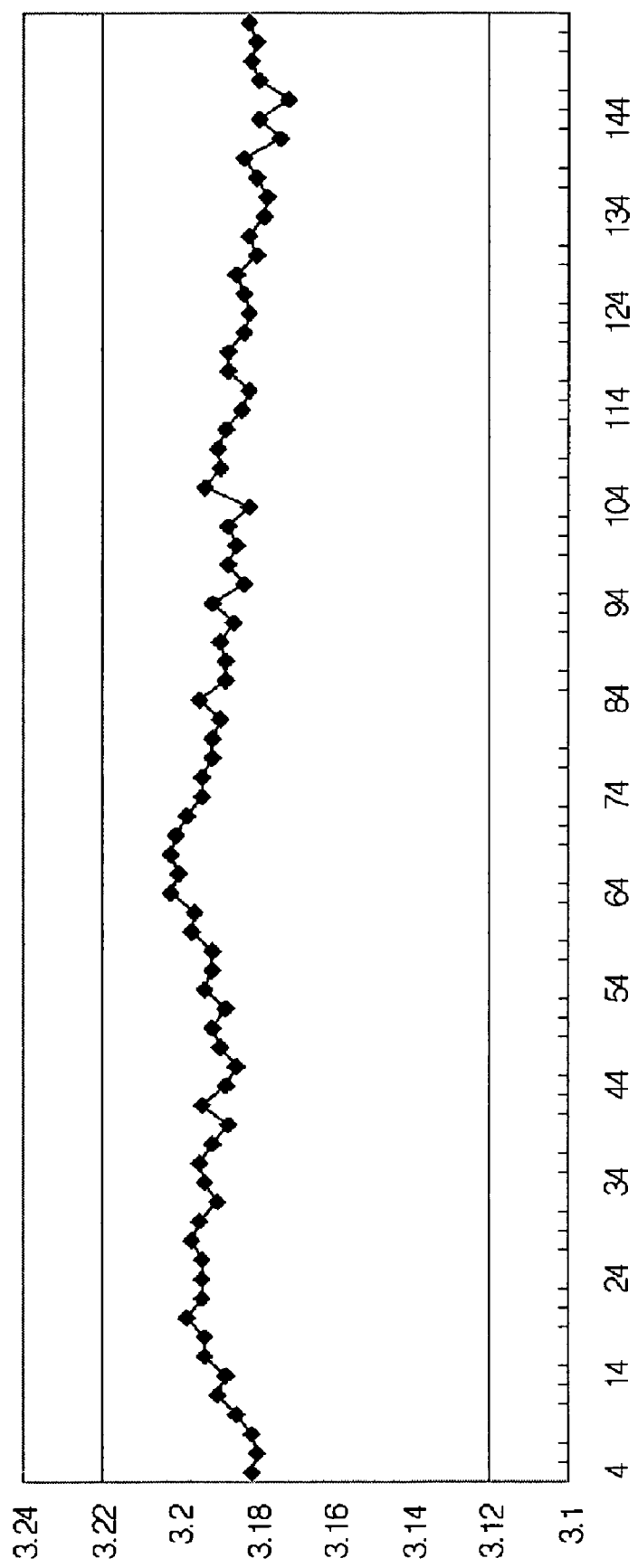
FIG. 5 is an experimental data representing that uniformity of the cell gap is improved as a contact density between protrusions and spacer is increased.

FIG. 5 is an experimental data representing that uniformity of the cell gap is improved as a contact density between protrusions and spacers is increased. The uniformity of the cell gap is known to be increased in the case of forming the protrusion and the spacer so that the contact density of the spacer and the protrusion becomes about 50~100 ppm, while the pressure concentration on the spacers is decreased since the contact area where the protrusions and the spacers are in contact with each other is increased, as shown the experimental result illustrated in FIG. 5. If the contact density of the spacer and the protrusion is increased, there is a problem of deteriorating picture quality such as creating a non-uniform black brightness.

To solve a waviness problem of an upper array substrate and a cell gap non-uniformity problem of the related art, this applicant proposes a technology of reduced contact friction between the spacer and the protrusion. That is to say, an area of contact between spacers and the protrusions is increased by reducing contact friction between the protrusions and the spacers so as to relieve the concentration of force at just some contact points between the protrusion and the spacer. Accordingly, an embodiment of the present invention proposes a method of forming a spacer made of a material with strong resisting force and the contact density of the spacers and protrusions is low, to thereby prevent black brightness non-uniformity, maintain the cell gap, and to alleviate waviness in the upper array substrate.

Figure 6:
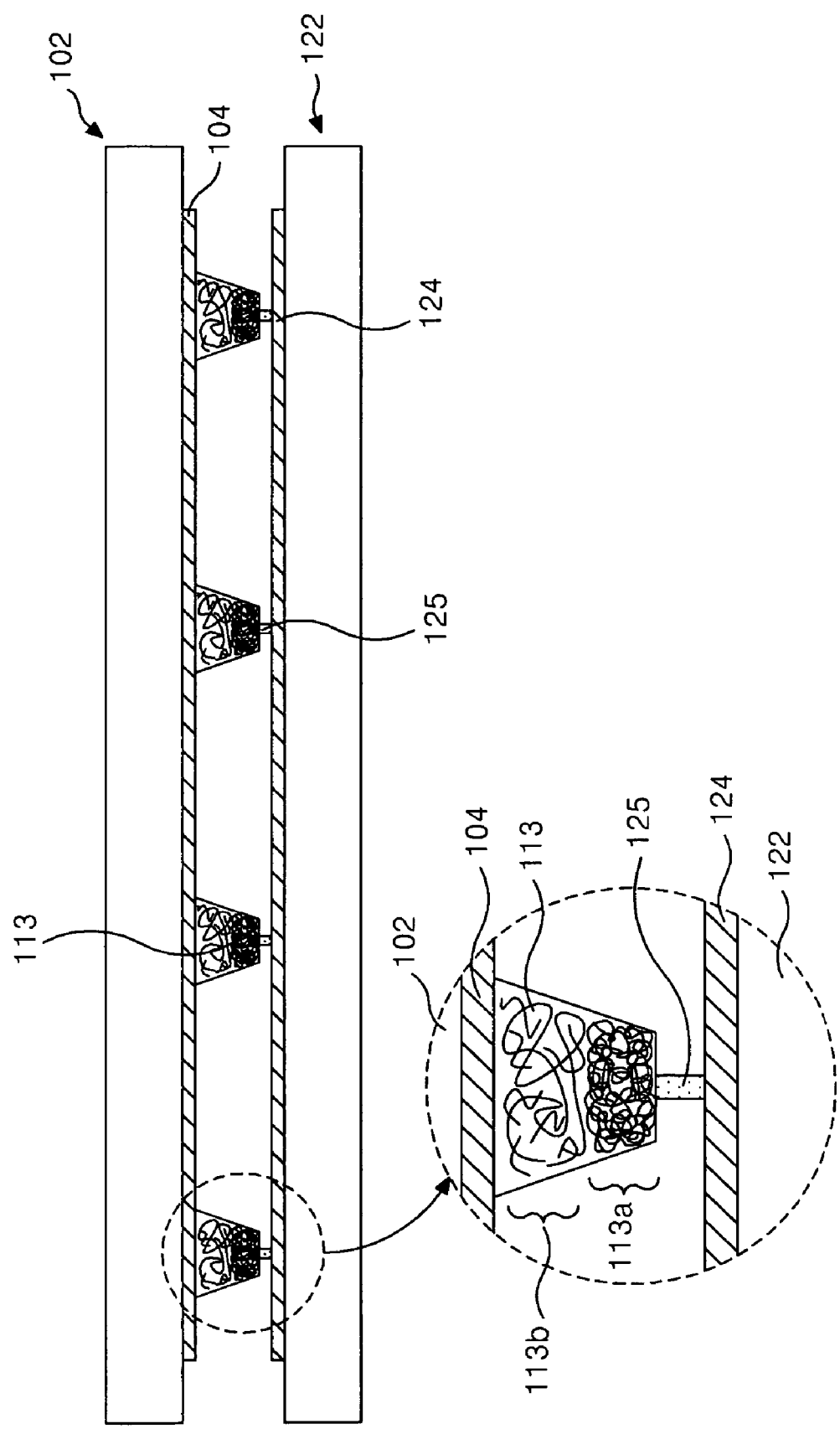
FIG. 6 is a cross-sectional diagram of a liquid crystal display panel according to an embodiment of the present invention.

FIG. 6 is a cross-sectional diagram of a liquid crystal display panel according to an embodiment of the present invention. The liquid crystal display panel shown in FIG. 6 includes an upper array substrate 102, a lower array substrate 122 opposite to the upper array substrate 102 with a liquid crystal area 105 therebetween; a protrusion 125 projecting toward the upper array substrate 102 from the lower array substrate 122; and spacers 113 that maintain a cell gap between the upper array substrate 102 and the lower array substrate 122. The spacers 113 have a relatively high hardness in a portion 113a contacting the protrusion 125.

A first thin film pattern 104, including a black matrix that defines a cell area and a color filter in the cell area defined by the black matrix, is formed on the upper array substrate 102. A second thin film pattern 124, including a gate line and a data line that crosses the data line, a thin film transistor formed adjacent to where the gate line and the data line cross, and a pixel electrode connected to the thin film transistor. The protrusion 125 is formed to project from the lower array substrate 122 and be in direct contact with the spacer 13 so as to avoid direct contact between the spacer 13 and the lower array substrate 122.

The spacer 113 is formed on the upper array substrate 102 by a photolithography process so as to have a structure in which its width gets narrower toward the lower array substrate 122. Hereinafter, a portion of the spacer 113 that has a relatively narrow width and is in direct contact with the protrusion 25 will be referred to as a "spacer upper portion 113a", and another portion that has a relatively wider width and is in contact with the upper array substrate 102 will be referred to as a "spacer lower portion 113b"

The spacer 113 in embodiments of the present invention is formed to have portions with different hardnesses so that a friction between the protrusions 125 and the spacers can be reduced while the spacer still has a degree of resiliency. As a result, after a bonding process is performed, it is possible that the upper array substrate 102 is leveled and a uniform cell gap can be obtained. Hereinafter, with reference to FIGS. 7 to 11, the spacer of the present invention will be more specifically explained.

In embodiments of the present invention, to solve a related art problem of a large static friction that appears because a force is concentrated on an area of the spacer 113, the spacer upper portion 113a in contact with the protrusion 125 is made to have a hardness greater than that of the spacer lower area 113b. Accordingly, the spacer upper portion 113a in direct contact with the protrusion 125 has less static friction so that additional spacers and protrusions can come into contact so that with a contact density of about 50 ppm, a recovery rate is not less than 80% even when some of the spacer upper portions 113a are slightly pressed by the protrusions 125. As a result, even when force is concentrated on the spacer upper portions 113a, the force is evenly dispersed to the spacer lower areas 113B because the spacer upper portions 113a can move with respect to the protrusions 125 such that force can be distributed via more spacer upper portions 113a. Accordingly, the waviness of the upper array substrate 102 disappears after a certain amount of time elapses after the bonding process.

The spacer 113 includes multifunctional monomer (MFM), multifunctional oligomer (MFO), multifunctional polymer (MFP), a photo-initiator (PI) and an additive. Herein, MFM can be Multifunctional Acrylate Monomer, MFO can be Bi-functional Acrylate Oligomer, MFP can be any one of Acrylate Co-polymer or Reactive Polymer, and PI can be Irgacure-369 or TPA (terephthalic Acid). PI reacts to light, thereby acting to initiate the reaction of other molecules. MFM, MFO, MFP react to light to form a designated film, and are included in the spacer 113 without being removed upon a development process. The additive acts to control coating property, film uniformity, adhesive property with the lower film.

FIG. 7 is a diagram representing structures of molecules that constitute a spacer in embodiments of the present invention. FIG. 7 shows molecular structure formulas of Multifunctional Acrylate Monomer, Bi-functional Acrylate Oligomer, Acrylate Co-polymer, Reactive Polymer, Irgacure-369, Terephtalic Acid, etc, and absorption wavelength ranges of Irgacure-369 and Terephtalic Acid. Herein, Irgacure-369 is known to absorb light of a wavelength range lower than Terephthalic Acid.

In embodiments of the present invention, the spacer 113 having portions with different hardnesses is formed using a single material and a photolithography process. Hereinafter, a fabricating process of the spacer 113 will be explained in conjunction with a fabricating process of the liquid crystal display panel. First, the upper array substrate 102 is provided with the first thin film patterns 104, including the black matrix and the color filter, and the lower array substrate 122 is provided with the second thin film pattern 124, including the signal lines, the thin film transistor and the pixel electrode. Then, a photolithography process of exposure and development processes is performed after a spacer material, including MFM, MFO, MFP, PI and an additive are formed on the upper array substrate 102. In the exposure process, the area of the upper substrate where the spacer 113 is to be formed is exposed to light through a transmission part of a mask.

Figure 8A:
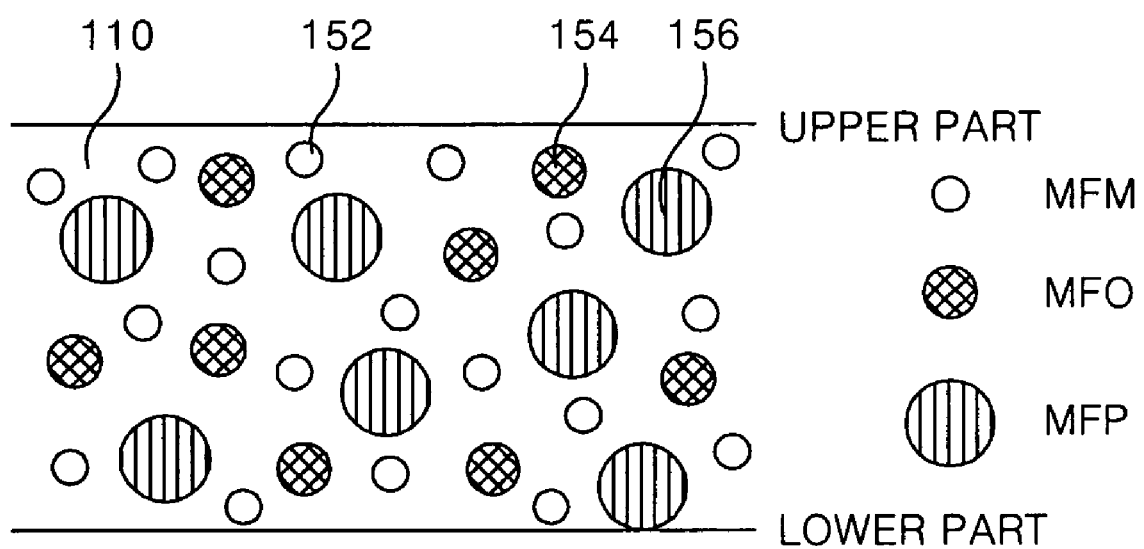
FIGS. 8A to 8B are diagrams of a molecular location distribution and a molecular chain structure of the spacer shown in FIG. 7, before exposure.
Figure 8B:
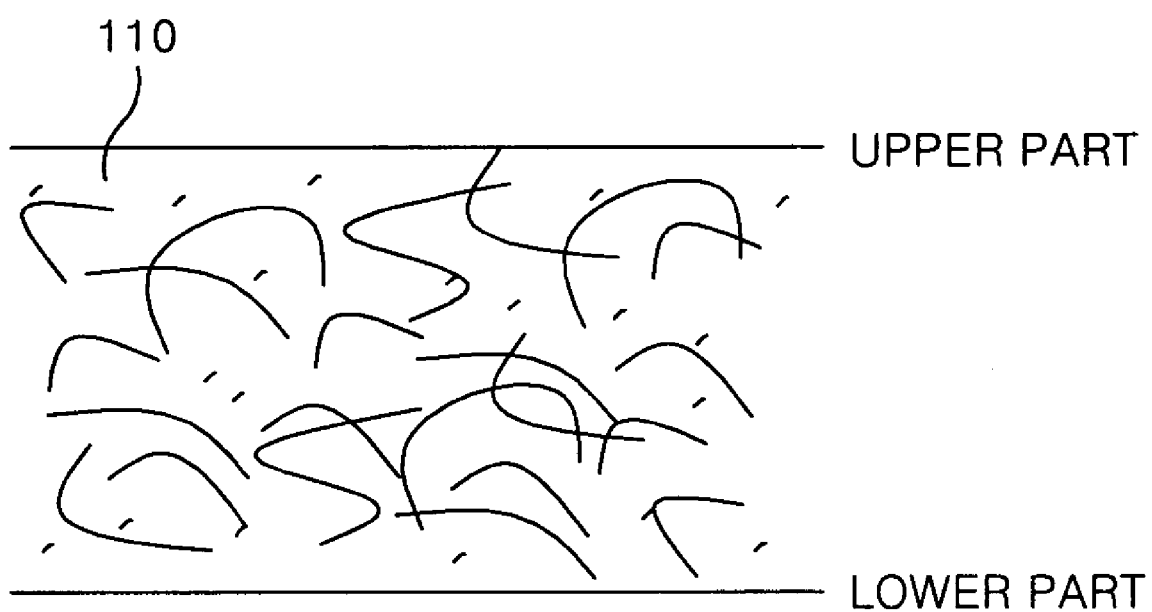

FIGS. 8A to 8B are diagrams of a molecular location distribution and a molecular chain structure of the spacer shown in FIG. 7, before exposure. First, the molecules within the spacer material 110 before exposure are randomly located, as shown in FIG. 8A. That is to say, MFM 152, MFO 154 and MFP 156 molecules are evenly distributed throughout the entire spacer material 110. Accordingly, as shown in FIG. 8B, the molecular chain structure also has no preponderance in a specific portion of the spacer material 110 so as to be evenly distributed in the entire spacer material 110.

Figure 9A:
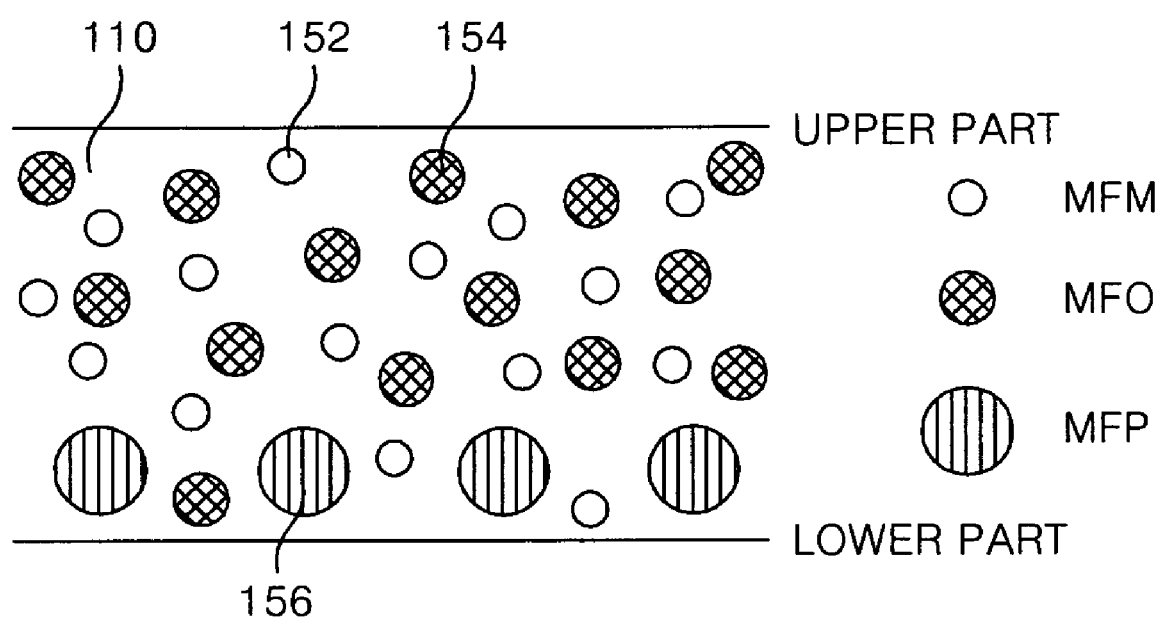
FIGS. 9A to 9B are diagrams of the molecular location distribution and the molecular chain structure of the spacer after exposure.
Figure 9B:
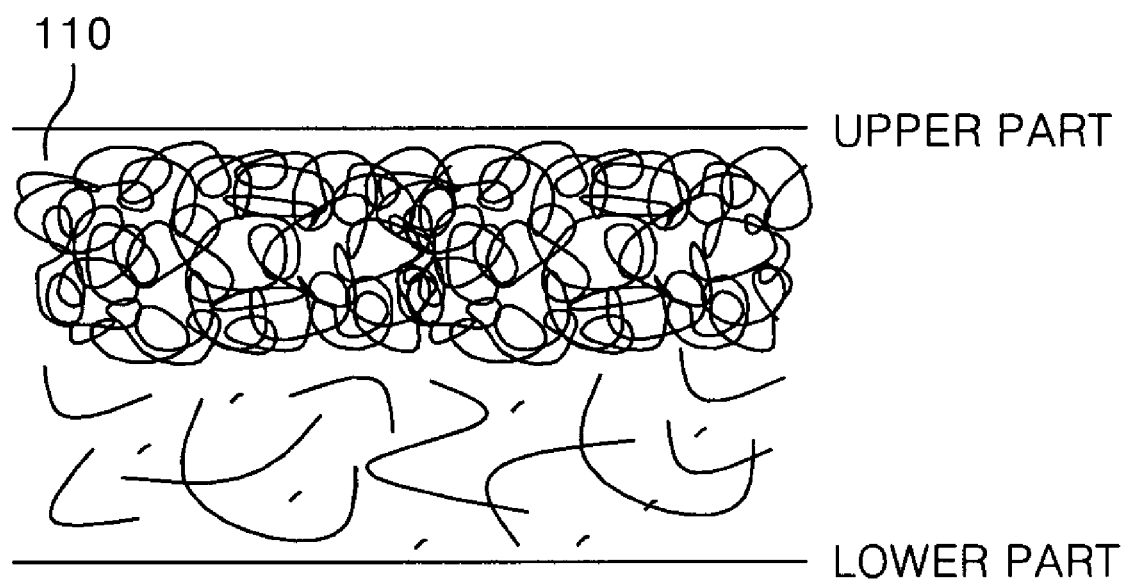

FIGS. 9A to 9B are diagrams of the molecular location distribution and the molecular chain structure in the spacer after exposure. When an exposure starts, exposure density weakens as it passes through an upper area of the spacer material to a lower material thereof, thus MFM 152 and MFO 154 are mainly located in the upper area of the spacer material 110 and MFP 156 is mainly located in the lower area of the spacer material 110.

Accordingly, MFM 152 and MFO 154 are firmly combined with each other in the upper area of the spacer material 110 as the exposure is in progress, and the MFM 152 and MFO 154 forms a concentration gradient that decreases from the upper portion of the spacer material 110 to the lower portion thereof. As a result, MFP 156 goes from the upper portion of the spacer material 110 to the lower portion. The moving speed of MFP 156 is slow because the molecular weight is high and it reacts with a small amount of MFM 152 and MFO 154. Thus, the molecular chain structure is made to be compact in the upper portion of the spacer material 110 so as to increase the hardness and the compactness of the molecular chain structure becomes relatively low in the lower portion of the spacer material so to decrease the hardness, as shown in FIG. 9B.

Figure 10:
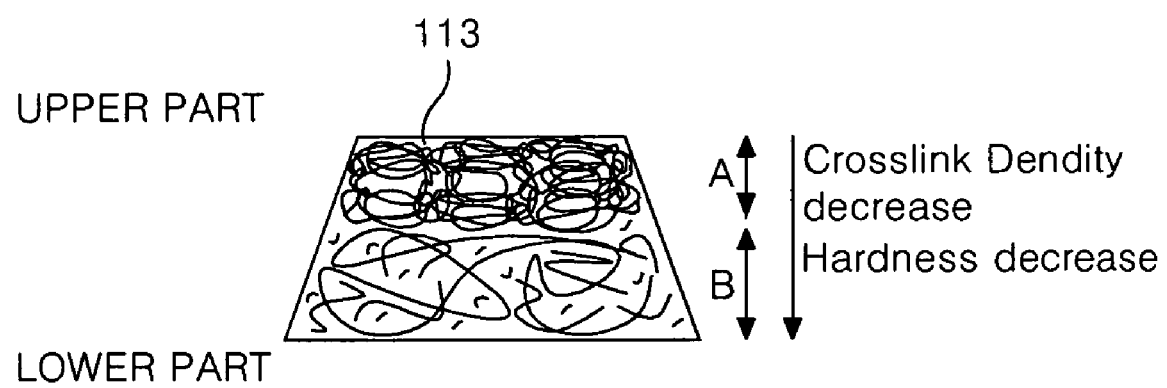
FIG. 10 is a diagram of an internal structure of the spacer after exposure and development processes in FIG. 9B.

Then, the development process is performed to thereby form the spacer 113 in which the density of the molecular chain structure (or crosslink) decreases from the upper portion to the lower portion, as shown in FIG. 10. Accordingly, the spacer 113 in an embodiment of the present invention has a structure in that hardness decreases from the upper portion to the lower portion such that the upper portion (A) of the spacer is made not to be deformed by a load applied by the protrusion 125 and the lower portion (B) of the spacer absorbs the load applied to the protrusion 125, thereby evenly dispersing the load.

If the bonding process of the upper array substrate 102 and the lower array substrate 122 is performed by use of the spacer 113, the upper portion (A) of the spacer 113 has a strong hardness to prevent the deformation caused by the concentrated load on the protrusion 125 and the lower portion (B) of the spacer 113 has a weak hardness to absorb the load concentrated on the upper portion (A) of the spacer 113 to evenly absorb and disperse the load.

FIG. 11 is a diagram representing a process of improving the cell gap uniformity of the liquid crystal display panel and leveling the bent upper array substrate using the spacer of an embodiment of the present invention. As shown in FIG. 11, a force is concentrated on one point of the upper portion 113a of the spacer by the protrusion 125 right after bonding the upper array substrate 102 and the lower array substrate 122, but the upper portion 113a of the spacer has a strong hardness so as to be almost recovered even though the upper portion 113a is somewhat depressed. At this moment, the force concentrated on the upper portion 113a of the spacer is dispersed to the lower portion 113b of the spacer, and the bent area of the upper array substrate 102 is pushed by the entire spacer 113. Accordingly, the pressure Patm applied to the liquid crystal display panel from the outside becomes equal to the pressure Pglass applied to the outside of the upper array substrate 102 and the pressure Pcs with which the spacer 113 pushes the upper array substrate 102. Thus, the wavy upper array substrate 102 is leveled and the cell gap uniformity is obtained.

In this way, the liquid crystal display panel and the fabricating method thereof according to an embodiment of the present invention keeps the cell gap between the upper array substrate 102 and the lower array substrate 122 by use of the spacer 113 in which hardness is decreases from the upper portion to the lower portion. As a result, the pressure concentrated on some of the protrusions 125 can evenly be dispersed to the entire spacer 113 through all of the protrusions, thereby leveling the waviness of the upper array substrate 102 and making the cell gap uniform.

The spacer proposed in an embodiment of the present invention can be easily applied to a liquid crystal display panel of ISP (in plane switching) mode, further to liquid crystal display panels of ECB (electrically controlled birefringence) mode and VA (vertical alignment) mode, as well as a liquid crystal display panel of TN (twisted nematic) mode.

As described above, the liquid crystal display panel and the fabricating method thereof according to an embodiment of the present invention maintains the cell gap between the upper array substrate and the lower array substrate by use of a spacer in hardness decreases from the upper portion to the lower portion of the spacer. The upper portion of the spacer has the high elastic force and high recovery force. Thus, almost no deformation is generated by the pressure applied by the protrusion, the lower area of the spacer disperses the force applied to the upper portion of the spacer through the spacer, and there is less friction between the spacer and the protrusion such that other spacers can receive portions of a force from other protrusions. As a result, the waviness of the upper array substrate is relieved and the uniformity of the cell gap is improved.

It will be apparent to those skilled in the art that various modifications and variations can be made in the Liquid Crystal Display Panel and Fabricating Method Thereof of the present invention without departing from the spirit or scope of the invention. Thus, it is intended that the present invention cover the modifications and variations of this invention provided they come within the scope of the appended claims and their equivalents.

What is claimed is:

1. A liquid crystal display panel, comprising:
   an upper array substrate and a lower array substrate that are positioned to be opposite to each other;
   a liquid crystal positioned between the upper and lower array substrates;
   a protrusion projecting from the lower array substrate; and
   a spacer positioned between the upper array substrate and the lower array substrate, the spacer having a first portion contacting the protrusion and a second portion contacting the upper array substrate, and the first portion has a first hardness greater than a second hardness of a second portion.

2. The liquid crystal display panel according to claim 1, wherein the first portion has a first molecular chain structure a compactness higher than a second molecular chain structure in the second portion.

3. The liquid crystal display panel according to claim 1, wherein the spacer includes at least one of a multifunctional monomer, a multifunctional oligomer, a multifunctional polymer, and a photoinitiator.

4. The liquid crystal display panel according to claim 3, wherein the multifunctional monomer is Multifunctional Acrylate Monomer, the multifunctional oligomer is Bi-functional Acrylate Oligomer, the multifunctional polymer is at least one of Acrylate Co-polymer and Reactive Polymer, and the photoinitiator is at least one of Irgacure-369 and Terephthalic Acid.

5. The liquid crystal display panel according to claim 1, wherein the first portion of the spacer has more multifunctional monomer and multifunctional oligomer than the second portion of the spacer.

6. The liquid crystal display panel according to claim 1, wherein the upper array substrate includes a black matrix that defines a cell area and a color filter located in the cell area divided by the black matrix, and the lower array substrate includes signal lines that cross each other, a thin film transistor that is located adjacent to where the signal lines cross, and a pixel electrode connected to the thin film transistor.

7. A fabricating method of a liquid crystal display panel, comprising:
   providing an upper array substrate having first thin film patterns;
   providing a lower array substrate having second thin film patterns;
   forming a protrusion on the lower array substrate;
   forming a spacer on the upper array substrate, the spacer having a first portion with a first hardness and a second portion with a second hardness different from the first hardness;
   providing a liquid crystal between the upper and lower array substrates; and bonding the upper and lower array substrates such that the first portion of the spacer contacts the protrusion and the second portion of the spacer contacts the upper array substrate, wherein the first hardness is greater than the second hardness.

8. The fabricating method according to claim 7, wherein the first portion has a first molecular chain structure, a compactness higher than a second molecular chain structure in the second portion.

9. The fabricating method according to claim 7, wherein the forming a spacer includes:
   forming a spacer material including at least one of multifunctional monomer, multifunctional oligomer, multifunctional polymer and a photoinitiator on the upper array substrate;
   exposing the spacer material to light; and
   removing the spacer material except for an area exposed by a developing process.

10. The fabricating method according to claim 9, wherein the exposing the spacer material to light includes:
   dividing distributions of the multifunctional monomer, the multifunctional oligomer and the multifunctional polymer into the first and second portions within the spacer material by the exposure of the spacer such that the distributions of the multifunctional monomer, multifunctional oligomer and the multifunctional polymer are different in the first and second portions.

11. The fabricating method according to claim 7, wherein the upper array substrate includes a black matrix that defines a cell area and a color filter located in the cell area divided by the black matrix, and the lower array substrate includes signal lines that cross each other, a thin film transistor that is located adjacent to where the signal lines cross, and a pixel electrode connected to the thin film transistor.

12. A liquid crystal display panel, comprising:
   an upper array substrate and a lower array substrate that are positioned to be opposite to each other;
   a liquid crystal positioned between the upper and lower array substrates;
   a protrusion projecting from the lower array substrate; and
   a spacer positioned between the upper array substrate and the lower array substrate, the spacer having a first portion contacting the protrusion and a second portion contacting the upper array substrate, and the first portion of the spacer has a first molecular chain structure a higher compactness than a second molecular chain structure in the second portion of the spacer.

13. The liquid crystal display panel according to claim 12, wherein the spacer includes at least one of multifunctional monomer, a multifunctional oligomer, a multifunctional polymer, and a photoinitiator.

14. The liquid crystal display panel according to claim 13, wherein the multifunctional monomer is Multifunctional Acrylate Monomer, the multifunctional oligomer is Bi-functional Acrylate Oligomer, the multifunctional polymer is at least one of Acrylate Co-polymer and Reactive Polymer, and the photoinitiator is at least one of Irgacure-369 and Terephthalic Acid.

15. The liquid crystal display panel according to claim 12, wherein the first portion of the spacer has more multifunctional monomer and multifunctional oligomer than the second portion of the spacer.

* * * * *